United States Patent
Heiges

(10) Patent No.: US 9,078,425 B1
(45) Date of Patent: Jul. 14, 2015

(54) HOT BODY DECOY

(75) Inventor: Charles W Heiges, Port Clinton, OH (US)

(73) Assignee: Fowl Foolers, Port Clinton, OH (US)

(*) Notice: Subject to any disclaimer, the term of this patent is extended or adjusted under 35 U.S.C. 154(b) by 652 days.

(21) Appl. No.: 13/408,182

(22) Filed: Feb. 29, 2012

Related U.S. Application Data

(63) Continuation-in-part of application No. 13/065,292, filed on Mar. 18, 2011, now abandoned.

(51) Int. Cl.
 *A01M 31/06* (2006.01)

(52) U.S. Cl.
 CPC .................. *A01M 31/06* (2013.01)

(58) Field of Classification Search
 CPC .................................. A01M 31/06
 USPC .............................. 43/3, 2, 1
 See application file for complete search history.

(56) References Cited

U.S. PATENT DOCUMENTS

| | | | |
|---|---|---|---|
| 547,033 A * | 10/1895 | Ross | 43/3 |
| 747,732 A * | 12/1903 | Kremer | 43/3 |
| 892,528 A * | 7/1908 | Kricke | 43/3 |
| 1,299,896 A * | 4/1919 | Anderson | 43/3 |
| 1,478,538 A * | 12/1923 | Sweeney | 43/3 |
| 2,545,800 A * | 3/1951 | Viken | 43/3 |
| 2,719,376 A * | 10/1955 | Risch | 43/3 |
| 2,857,623 A * | 10/1958 | Clark | 43/3 |
| 2,880,544 A * | 4/1959 | Crummer et al. | 43/3 |
| 2,984,974 A * | 5/1961 | Bell | 43/3 |
| 3,046,192 A * | 7/1962 | Bilyen | 43/2 |
| 3,119,650 A * | 1/1964 | Bilyeu | 43/2 |
| 3,470,645 A * | 10/1969 | Mattson | 43/3 |
| 3,704,538 A * | 12/1972 | Gagnon | 43/3 |
| 3,888,032 A * | 6/1975 | Gagnon | 43/3 |
| 4,322,908 A * | 4/1982 | McCrory | 43/3 |
| 4,691,464 A * | 9/1987 | Rudolph | 43/3 |
| 4,771,563 A * | 9/1988 | Easley | 43/1 |
| 4,773,178 A * | 9/1988 | Marek | 43/2 |
| 4,829,695 A * | 5/1989 | Hoecherl | 43/3 |
| 4,845,872 A * | 7/1989 | Anderson | 43/3 |
| 4,890,408 A * | 1/1990 | Heiges et al. | 43/3 |
| 4,937,431 A * | 6/1990 | Jameson et al. | 43/1 |
| 5,029,408 A * | 7/1991 | Smith | 43/1 |
| 5,094,025 A * | 3/1992 | Daniels | 43/1 |
| 5,293,709 A * | 3/1994 | Cripe | 43/3 |
| 5,429,271 A * | 7/1995 | Porter | 43/1 |
| 5,555,663 A * | 9/1996 | Burgeson | 43/1 |
| 5,983,552 A * | 11/1999 | Nelson | 43/2 |
| 6,115,953 A * | 9/2000 | Wise | 43/2 |
| 6,374,530 B1 * | 4/2002 | Mierau | 43/3 |
| 6,443,434 B1 * | 9/2002 | Prather | 43/1 |
| 6,460,284 B1 * | 10/2002 | Rabo | 43/3 |
| 6,463,690 B1 * | 10/2002 | Wood et al. | 43/2 |
| 6,584,721 B1 * | 7/2003 | Reule et al. | 43/3 |
| 6,655,070 B2 * | 12/2003 | Wood | 43/2 |
| 6,857,579 B2 * | 2/2005 | Harris | 43/1 |

(Continued)

*Primary Examiner* — Darren W Ark
(74) *Attorney, Agent, or Firm* — Richard K. Thomson

(57) ABSTRACT

A game decoy is provided with a heat-producing and conducting, surface-activating system to melt frozen precipitation and to dry off any surface moisture for the melted precipitation or rain which may otherwise lie on the surface. Such "wet look" decoys can provide a warning to game animals defeating the designed purpose of the decoy. An anti-icing, anti-moisture coating can be employed as well to discourage ice, snow and moisture from adhering to the surface of the decoy.

9 Claims, 1 Drawing Sheet

(56) References Cited

U.S. PATENT DOCUMENTS

| | | | |
|---|---|---|---|
| 7,438,873 B2* | 10/2008 | Saxon et al. | 43/2 |
| 7,528,187 B2* | 5/2009 | Jeckle | 524/210 |
| 7,788,839 B2* | 9/2010 | McPherson | 43/3 |
| 7,975,421 B2* | 7/2011 | Ware et al. | 43/3 |
| 7,975,423 B2* | 7/2011 | Brestal et al. | 43/3 |
| 8,146,285 B1* | 4/2012 | Jones et al. | 43/3 |
| 8,266,836 B2* | 9/2012 | Ware et al. | 43/3 |
| 8,276,308 B1* | 10/2012 | Jones et al. | 43/3 |
| 2002/0116858 A1* | 8/2002 | Valencic et al. | 43/1 |
| 2003/0037476 A1* | 2/2003 | Peavy | 43/1 |
| 2006/0117637 A1* | 6/2006 | Jeckle | 43/3 |
| 2007/0199228 A1* | 8/2007 | Johnson | 43/3 |
| 2007/0200337 A1* | 8/2007 | Johnson et al. | 43/3 |
| 2007/0266613 A1* | 11/2007 | Nelson | 43/3 |
| 2009/0031608 A1* | 2/2009 | Burgeson | 43/1 |
| 2009/0320351 A1* | 12/2009 | Darian | 43/3 |
| 2012/0198751 A1* | 8/2012 | Zeigler | 43/2 |

* cited by examiner

HOT BODY DECOY

This application is a continuation-in-part of U.S. patent application Ser. No. 13/065,292 filed Mar. 18, 2011, now abandoned.

BACKGROUND AND SUMMARY OF THE INVENTION

The present invention is directed to the field of sporting goods. More particularly, the present invention is directed to an improved game decoy with means to heat the surface of the decoy and/or prevent moisture from sticking to the surface of the decoy in the form of rain, ice or snow.

The present invention is directed to an improvement to Applicant's U.S. Pat. No. 4,890,408 hereby incorporated by reference. The duck decoy described and claimed therein, marketed under the product name FOWL FOOLERS™, features a coarse, burlap-like fabric adhesively secured to the exterior of the body of the decoy, as well as a longitudinal keel running beneath the body which enhances the stability of the decoy. While the present invention is applicable to the duck decoys of the prior invention, it has broader application. It will be appreciated that the heating system ("hot body") used to heat the surface of a decoy, although described in conjunction with a decoy used in hunting waterfowl, may be used with any type of decoy and is not restricted to decoys used to hunt waterfowl.

Various types of decoys have been employed heretofore in the hunting of waterfowl such as ducks and geese in order to attract the fowl and entice them to fly over or land on a designated particular area of land or water. When hunting is to be conducted in a selected area, a number of decoys are deployed in the area to attract overflying fowl to that area. Of course, the more natural and prominent the deployed decoys can be made to appear, the more likely they are to attract overflying fowl. The body and head configuration, the surface coloring and texture, and the manner in which the anchored decoy rides or floats in the water, all influence the appearance of a group of decoys.

Efforts have continued over the years to improve the appearance and performance of such decoys, and to that end it has been suggested the bodies may be formed in various ways. For example, U.S. Pat. No. 547,033 discloses a decoy formed by filling a fabric covering affixed to a floating base with loose material such as grass, straw, leaves, paper, or excelsior. U.S. Pat. No. 2,719,376 pertains to a decoy having a hollow molded pulp body. U.S. Pat. No. 3,704,538 suggests a decoy having an air inflatable body portion, while the decoy of U.S. Pat. No. 3,888,032 employs as the body a flexible, resilient, molded shell which is collapsible but which will return to its original shape when the collapsing force is removed. The surfaces of the bodies are generally configured and ornamented in one way or another to resemble, as nearly as possible, the feather arrangement and coloring of a particular species of waterfowl. In most present day decoys the surface of the body itself is formed with a feature appropriate to achieve the desired visual effect, and the surface is then painted or decorated. Such an arrangement has not been found entirely satisfactory in that the surface does not present a realistic appearance and the finish is often damaged by the rough handling to which the decoys are subjected.

A particularly objectionable feature of prior art decoys is their failure to cope with the issue of precipitation. Conventional decoys are subject to the build up of snow, ice and/or appearance of a rain-slick surface, none of which accurately reflects the appearance of living birds. Such flawed decoys can result in a flock of ducks/geese remaining on the wing when they do their "fly by" to determine if landing on the pond or in the field is warranted. Similarly, precipitation buildup on other types of game decoys, can similarly defeat the functions of those decoys. It is among the objects of the present invention to provided a heating system for the surface of the decoy which will melt ice, sleet and snow and dry up any rain-slick surface to minimize the phony look precipitation produces on the surface of the decoy and/or prevent moisture from sticking to the surface of the decoy in the form of rain, ice or snow.

The decoy or the present invention for use in hunting waterfowl, game birds, game animals, and the like, comprises: a) a body portion having an external surface area; b) heat producing and conducting means associated with a significant portion of the surface area to melt any frozen precipitation and eliminate a shine produced by a wet surface of said decoy. The heat producing and conducting means preferably includes a heat producing/transmitting material associated with the surface area of the decoy. For example, the heat transmitting material may include a resistance wire system embedded in the decoy below or on top of the surface area. The heat producing and transmitting means will preferably include an underlayment of conducting material which will spread the heat more evenly over the external surface area. This underlayment may comprise a metallic, metallic blend, glass, rubber or synthetic rubber or other heat-conducting material. Flexible heating tapes which are suitable for this application include silicone rubber heating tapes and etched foil tapes of the type widely available from manufacturers including Hi-Heat Industries, Thermo Heating Elements LLC, Omega Engineering, Birk Engineering Thermal Solutions, and Zoppas Industries. The heat producing and conducting means may further include a heat energy source selected from a group consisting of alternating current, direct current, chemical, solar, geothermal and include a heat conducting surface member in contact with said energy source. A fabric selected from a group consisting of burlap, cotton, synthetic fiber, cotton-synthetic blend, metallic, metallic blend, and chemically/mechanically bonded coating, is secured to at least a portion of the surface area concealing the heat producing and conducting means.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
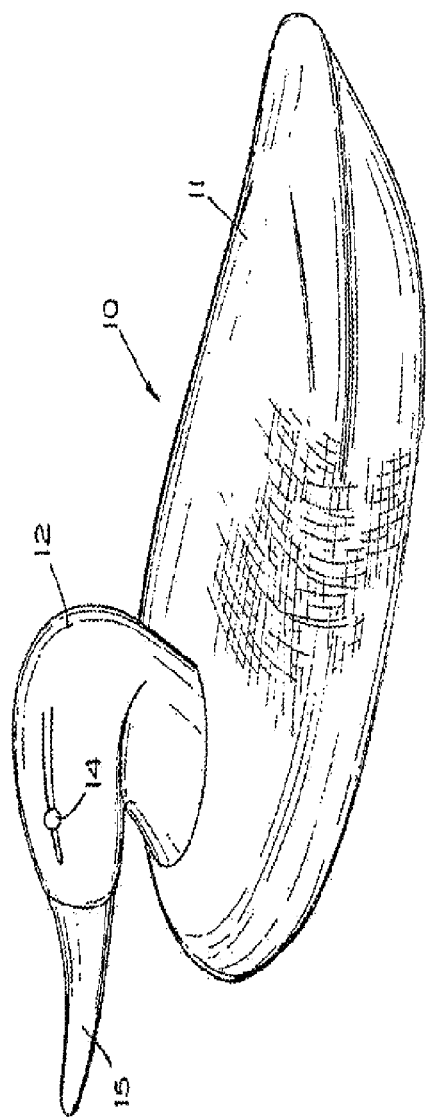
FIG. 1 is a front perspective view of a first embodiment of the hot body decoy of the present invention; and, FIG. 2 is a side view of first embodiment.
Figure 2:
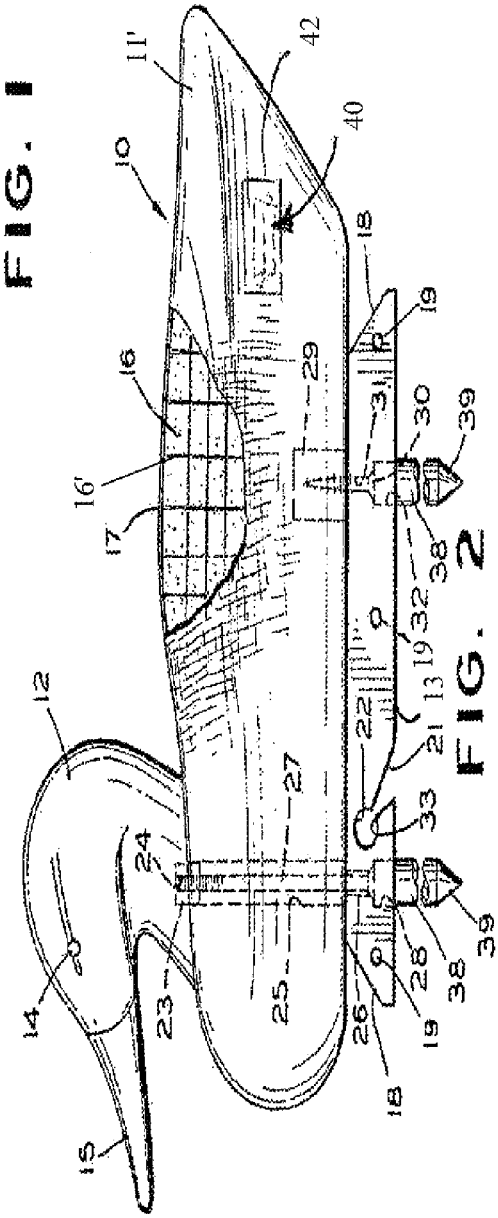

A first embodiment of the Hot Body™ decoy of the present invention is depicted in FIGS. 1-2 generally at 10. As depicted in FIGS. 1 and 2, by way of example and not limitation, waterfowl decoy 10 has a body portion 11, a head portion 12, head portion 12 including an eye 14 and a beak 15. It will be appreciated that the duck decoy 10 could be configured without a head as embodying a duck in a head-down, feeding position. Obviously, other configurations could apply the features of the present invention designed to decoy geese, swan, pheasant, quail, turkey, deer, elk, moose, rabbit, fox, or any game animal desired.

As shown for this specific waterfowl application, decoy 10 is equipped with a keel 13 with sloped surfaces 18, fore and aft, a plurality of anchor tie points 19 including one mid-ship, as well as alternative posts 38 having soil-penetrating points 39 for use in a corn field, for example. As shown in FIG. 2, the body 11 of decoy 10 is made of a light-weight material 16 which, for this application, is preferably covered with a heat-conducting material. The purpose of the heat-conducting material is to create a heat-conductive underlayment to make the application of the heat more uniform to achieve melting/drying over the entire surface, rather than simply above the embedded wire mesh 16'. Suitable heat-conducting materials include flexible heating tapes which include silicone rubber heating tapes and etched foil tapes of the type widely available from manufacturers including Hi-Heat Industries, Thermo Heating Elements LLC, Omega Engineering, Birk Engineering Thermal Solutions, and Zoppas Industries. The heating tape may be custom designed for the specific application or bought off-the-shelf and applied to the external surface of decoy 10. Underlayment may take the form of conductive material including, but not limited to glass, a fine-mesh screen, metal, metallic blend, rubber, synthetic rubber such as Neoprene®, or other heat conductive material.

The head portion 12 and keel 13 are affixed to the body portion 11 after the fabric layer 17 has been applied and the covering suitably painted and ornamented. The head may include a fitting 23 having interior threads 24. An opening 25 extends through the body section beneath the head, and a matching opening 26 is provided in the keel for receiving a bolt or screw 27 which extends through the opening 25 and is threaded into the fitting 23. The keel is counterbored at 28 to receive the head of the bolt or screw 27. An insert 29 is provided within the molded body section for receiving a screw 30 extending through an opening 31 at the rear of the keel. A counterbore 32 is provided in the keel for recessing the head of the screw 30. The tapered slot 21 and enlarged opening 22 are so constructed that at their intersection raised lip 33 is formed between the bottom of the circular opening and the entrance to the slot. While the features of this invention are described in conjunction with a particular form of decoy, namely, that of the '408 patent, it will be understood that this invention can be applied to any and all forms of decoys for waterfowl and other game animals.

The heat-producing and conducting means for the hot body decoy 10 includes material 16 overlain by wire mesh 16'. Wire mesh 16' overlies a significant portion of the surface 11' of decoy 10 as well as head portion 12, in embodiments which include a head portion. The heat source for hot body decoy 10 is selected from a group consisting of direct current, chemical, solar, alternating current and geothermal (these latter two, for land-based applications) or any other suitable heat source. Energy source 40 is shown as a battery pack enclosed in a waterproof compartment 42 in a tail portion or bottom portion of decoy 10. Alternatively, energy source 40 could take the form of a chemical heat-producing packet of the type sold by HeatMax under the trade names "HotHands" and "The Foot Warm-up". Similar products are available from other manufacturers and would work as well. These chemical packets could be installed in the compartment in place of the battery pack described herein.

The heat producing and conducting means 16, 16' is covered by an outer "skin" layer 17 which is preferably a burlap-like material. However, it will be appreciated that the skin layer 17 may be selected from a group consisting of burlap, cotton, synthetic fiber, cotton-synthetic blend, or other suitable fabric, and chemically/mechanically bonded coating, secured to at least a portion of the surface area 11' concealing the heat producing and conducting means 16, 16'. Alternatively to providing a separate underlayment, the skin layer 17 may include a heat-conducting fabric such as metallic, metallic blend, fiberglass, glass, rubber, synthetic rubber or other suitable material. In either case, the underlayment or skin layer 17 may be attached using a mechanical attachment such as nails, screws, tacks, thread or other mechanical bond, and/or an adhesive or other chemical bonding technique. Such surface skin layers 17 can be painted to achieve the desired appearance for decoy 10.

An alternative or additional ice preventative measure would be the use of a hydrophobic material such as Rain-X or teflon, or the like. In addition, or as an alternative, icephobic coatings such as the Anti-Ice Coatings & Paint available from Ecological Coatings in Clifton Park N.Y. These icephobic ("anti-ice") materials are identified as nanomaterials, nanostructure, and nanoparticles. These extremely small particles form such a tight surface coating, there are no spaces available in which water molecules can collect to form ice. This coating works much like the Rain-X windshield coatings causing the water droplets to bead up and run off rather than freezing onto the surface. It will be appreciated that these hydrophobic/icephobic materials can be blended into the surface paint or coating to allow the functional/aesthetic appearance desired for the decoy 10. The optimum solution would be to have a heated subsurface on decoy 10 with a hydrophobic or icephobic coating on top of, or blended into, the painted exterior. Then, in most instances, the snow/ice will not stick to the coated surface and, any snow/ice which might stick will melt as a result of the energy source 40 and the resulting moisture will be vaporized by the heat source.

Various changes, alternatives, and modifications will become apparent to a person of ordinary skill in the art after a reading of the foregoing specification. While the decoy of the present invention has been specifically described as being a floating duck decoy, it will be appreciated that the features of the present invention may readily be applied to land-based decoys for ducks, other fowl, or any variety of game animals. It is intended that all such changes, alternatives, and modifications as fall within the scope of the appended claims be considered part of the present invention.

I claim:

1. A decoy for use in hunting waterfowl, game birds, game animals, and the like, said decoy comprising:
   a) a body portion having an external surface area, said body portion simulating an appearance of a body portion of an animal;
   b) a head portion having an external surface area, said head portion being attached to said body portion and simulating an appearance of a head portion of the animal;
   c) heat producing and conducting means overlying a significant portion of said body portion and head portion external surface areas to melt any frozen precipitation and eliminate a shine produced by a wet surface of said decoy, said heat producing and conducting means including a resistance wire system covering a significant portion of said body portion and said head portion of said decoy; and
   d) an energy source for providing heat energy to said heat producing and conducting means, said energy source selected from a group consisting of alternating current, direct current, and geothermal.

2. The decoy of claim 1 wherein said heat producing and conducting means further comprises a heat transmitting material associated with said body portion and head portion external surface area of said decoy.

3. The decoy of claim 2 further comprising a fabric selected from a group consisting of burlap, cotton, synthetic fiber, cotton-synthetic blend, metallic, metallic blend, rubber, synthetic rubber, fiberglass, glass and chemically/mechanically bonded coating, said fabric secured to at least a portion of said body portion and head portion external surface areas concealing said heat producing and conducting means.

4. The decoy of claim 1 further comprising a coating applied to said body portion and head portion external surface areas of said decoy, said coating selected from a group consisting of anti-ice coating and anti-moisture coating, said coating inducing moisture to run off said external surface areas.

5. A decoy for use in hunting waterfowl, game birds, game animals, and the like, said decoy comprising:
   a) a body portion having an external surface area, said body portion simulating an appearance of a body portion of an animal;
   b) a head portion having an external surface area, said head portion being attached to said body portion and simulating an appearance of a head portion of the animal;
   c) heat producing and conducting means overlying a significant portion of said body portion and head portion external surface area to melt any frozen precipitation and eliminate a shine produced by a wet surface of said decoy, said heat producing and conducting means including a resistance wire system covering a significant portion of said body portion and said head portion of said decoy; and
   d) a coating applied to said body portion and head portion external surface area of said decoy, said coating selected from a group consisting of anti-ice coating and anti-moisture coating, said coating inducing moisture to run off said body portion and head portion external surface areas.

6. The decoy of claim 5 wherein said anti-ice coating comprises a material selected from the group of nanomaterials, nanostructure, and nanoparticles.

7. The decoy of claim 5 wherein said heat producing and conducting means further comprises a heat transmitting material associated with said body portion and head portion external surface areas of said decoy.

8. The decoy of claim 7 wherein said heat producing and conducting means comprises an energy source selected from a group consisting of alternating current, direct current, chemical, solar and geothermal.

9. The decoy of claim 8 further comprising a fabric selected from a group consisting of burlap, cotton, synthetic fiber, cotton-synthetic blend, metallic, metallic blend, rubber, synthetic rubber, fiberglass, glass, and chemically/mechanically bonded coating, secured to at least a portion of said body portion and head portion external surface areas concealing said heat producing and conducting means.

* * * * *